US010325285B1

(12) United States Patent
Wai

(10) Patent No.: US 10,325,285 B1
(45) Date of Patent: Jun. 18, 2019

(54) PREDICTIVE RECOMMENDATION SYSTEM

(71) Applicant: Groupon, Inc., Chicago, IL (US)

(72) Inventor: Lawrence Lee Wai, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 13/929,977

(22) Filed: Jun. 28, 2013

(51) Int. Cl.
G06Q 30/02 (2012.01)

(52) U.S. Cl.
CPC ..... G06Q 30/0255 (2013.01); *G06Q 30/0224* (2013.01); *G06Q 30/0251* (2013.01)

(58) Field of Classification Search
CPC ........................................................ G06Q 30/02
See application file for complete search history.

(56) References Cited

U.S. PATENT DOCUMENTS

| | | | | |
|---|---|---|---|---|
| 2004/0199419 A1* | 10/2004 | Kim | .................. | G06Q 30/02 705/14.4 |
| 2007/0022003 A1* | 1/2007 | Chao | .................. | G06Q 30/02 705/14.46 |
| 2007/0088603 A1* | 4/2007 | Jouppi et al. | ................. | 705/14 |
| 2007/0239534 A1* | 10/2007 | Liu et al. | ................. | 705/14 |
| 2009/0012841 A1* | 1/2009 | Saft et al. | ................. | 705/10 |
| 2009/0171813 A1* | 7/2009 | Byrne | ............... | G06F 17/30867 705/26.1 |
| 2010/0250330 A1* | 9/2010 | Lam | .................. | G06Q 30/02 705/59 |
| 2011/0029362 A1* | 2/2011 | Roeding | ............... | G06Q 30/00 705/14.13 |
| 2011/0040636 A1* | 2/2011 | Simmons et al. | ......... | 705/14.71 |
| 2011/0258039 A1* | 10/2011 | Patwa | .................. | G06Q 30/00 705/14.45 |
| 2012/0158504 A1* | 6/2012 | Kumar et al. | ............. | 705/14.53 |
| 2013/0097012 A1* | 4/2013 | Ferber et al. | .............. | 705/14.45 |
| 2013/0124257 A1* | 5/2013 | Schubert | ............... | G06Q 30/02 705/7.29 |

OTHER PUBLICATIONS

U.S. Appl. No. 13/829,581, filed Mar. 14, 2013.

* cited by examiner

*Primary Examiner* — Vincent M Cao
(74) *Attorney, Agent, or Firm* — Alston & Bird LLP

(57) ABSTRACT

In general, embodiments of the present invention provide systems, methods and computer readable media for a predictive recommendation system based on an analysis of previous consumer behavior. One aspect of the subject matter described in this specification can be embodied in methods that include the actions of receiving data representing a user, the data including user identification and historical data; receiving a set of promotions recommended for the user; assigning the user to a consumer lifecycle model state based in part on the historical data and the user identification; selecting a ranking algorithm associated with the consumer lifecycle model state; and ranking the received set of promotions based on a predicted promotion relevance value associated with each promotion, the predicted promotion value being calculated using the ranking algorithm.

31 Claims, 10 Drawing Sheets

Exemplary Feature Set

| feature | binning | data size |
|---|---|---|
| bcookie engagement / activation state | | per bcookie |
| distance from bcookie to deal | 1,2,4,8... | N/A for real time |
| distance from deal to division centroid (hot spot) | 1,2,4,8... | per deal |
| bcookie gender | | per bcookie |
| deal category | | per deal |
| deal price | 10,20,40,80... | per deal |
| # impressions of the deal for the bcookie | 0,1,2 or more | per bcookie per deal |
| # impressions of the pds for the bcookie | 0,1,2 or more | per bcookie per pds |
| # impressions of the subcategory for the bcookie | 0,1,2 or more | per bcookie per subcategory |
| # impressions of the category for the bcookie | 0,1,2 or more | per bcookie per category |
| # detailed views of the deal for the bcookie | 0,1,2 or more | per bcookie per deal |
| # detailed views of the pds for the bcookie | 0,1,2 or more | per bcookie per pds |
| # detailed views of the subcategory for the bcookie | 0,1,2 or more | per bcookie per subcategory |
| # detailed views of the category for the bcookie | 0,1,2 or more | per bcookie per category |
| clicks per impression of the deal (all bcookies) | 10,20,40,80... | per deal |
| clicks per impression of the pds (all bcookies) | 10,20,40,80... | per pds |
| clicks per impression of the subcategory (all bcookies) | 10,20,40,80... | per subcategory |
| clicks per impression of the category (all bcookies) | 10,20,40,80... | per category |
| orders per impression of the deal (all bcookies) | 1,2,4,8... | per deal |
| orders per impression of the subcategory (all bcookies) | 1,2,4,8... | per subcategory |
| profit per impression of the deal (all bcookies) | 1,2,4,8... | per deal |
| profit per impression of the subcategory (all bcookies) | 1,2,4,8... | per subcategory |

Non-Activated Ranking Target
Exemplary Feature Set

| feature |
|---|
| # detailed views of deal by bcookie |
| conversion rate for deal (all users) |
| distance from bcookie to deal |
| conversion rate for subcategory (all users) |
| deal category |
| deal price |
| # impressions of deal by bcookie |
| # detailed views of subcategory by bcookie |
| bcookie gender |
| # impressions of subcategory by bcookie |

Disengaged Ranking Target Feature Set

| feature |
|---|
| clicks per impression for deal (all bcookies) |
| # detailed views of pds by bcookie |
| # detailed views of deal by bcookie |
| # impressions of deal by bcookie |
| # detailed views of subcategory by bcookie |
| clicks per impression for pds (all bcookies) |
| deal category |
| deal price |
| # impressions of subcategory by bcookie |
| distance from deal to division centroid (hot spot) |
| # impressions of pds by bcookie |
| clicks per impression for subcategory (all bcookies) |
| # detailed views of category by bcookie |
| # impressions of category by bcookie |
| distance from bcookie to deal |
| clicks per impression for category (all bcookies) |
| bcookie gender |

FIG. 6C

PREDICTIVE RECOMMENDATION SYSTEM

FIELD OF THE INVENTION

Embodiments of the invention relate, generally, to a predictive recommendation system based on analysis of previous consumer behavior.

BACKGROUND

Current methods for recommending promotions to consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

Embodiments of the present invention provide herein systems, methods and computer readable media for a predictive recommendation system based on an analysis of previous consumer behavior.

In general, one aspect of the subject matter described in this specification can be embodied in methods that include the actions of receiving data representing a user, the data including user identification and historical data; receiving a set of promotions recommended for the user; assigning the user to a consumer lifecycle model state based in part on the historical data and the user identification; selecting a ranking algorithm associated with the consumer lifecycle model state; and ranking the received set of promotions based on a predicted promotion relevance value associated with each promotion, the predicted promotion value being calculated using the ranking algorithm.

These and other embodiments can optionally include one or more of the following features. The ranking algorithm is based on a ranking target. The ranking target may be a quantity of orders per impression, a quantity of profit per impression, or a quantity of clicks per impression. Calculating the predicted promotion relevance value using the ranking algorithm may comprise generating a feature vector describing the promotion using feature data representing attributes of the user and attributes of the promotion; and calculating the predicted promotion relevance value using the feature vector. The feature data representing attributes of the user may include at least one of the historical data representing the user and the user identification. The ranking algorithm may be generated using supervised learning. The ranking algorithm may be a classifier, a neural network, or an ensemble of decision trees. Assigning the user to a consumer lifecycle model state may comprise determining at least one of the user's level of engagement and the user's level of activation. Ranking the received set of promotion recommended for the user may be included in a workflow for selecting the promotion recommended for the user. The user identification may include a bcookie.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6A is a table summarizing an exemplary feature set that describes a promotion to be ranked in accordance with some embodiments discussed herein;

FIG. 6B is a table summarizing an exemplary feature set used to generate a feature vector for input to a predictive function with an associated ranking target for Non-Activated lifecycle model use cases in accordance with some embodiments discussed herein;

FIG. 6C is a table summarizing an exemplary feature set used to generate a feature vector for input to a predictive function with an associated ranking target for Disengaged lifecycle model use cases in accordance with some embodiments discussed herein;

DETAILED DESCRIPTION

Figure 1:
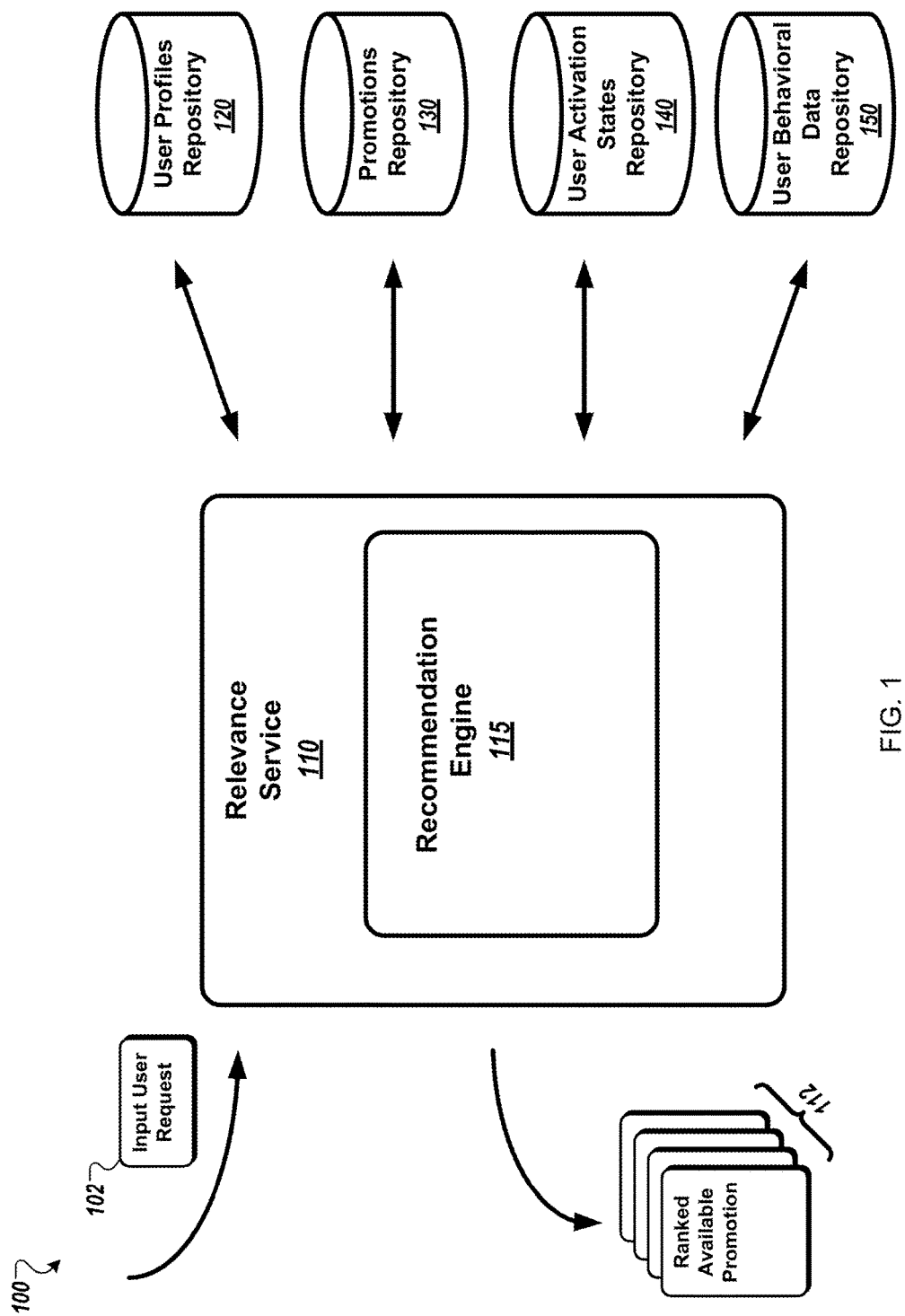
FIG. 1 illustrates an example system that can be configured to implement the relevance ranking of promotions that are available from a promotion and marketing service and are to be recommended to a particular user in accordance with some embodiments discussed herein.

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities. The term "instrument" may be used to refer, without limitation, to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the term "consumer" and "customer" may be used interchangeably to refer, without limitation, to a client, customer, purchaser, shopper, user or the like who may be in the position to or does exchange value for one or more instruments under the terms defined by the one or more promotions. For example, and using the aforementioned running company as the example provider, an individual who is interested in purchasing running shoes.

The capability to recommend promotions for purchase that are most relevant to each consumer is important for a promotion and marketing service, because maintaining an active and engaged customer base means maximizing profits. In some embodiments, a relevance system is used to select promotions to be recommended to a consumer (i.e., the available promotions that are most relevant to the consumer) based on using stored data representing attributes of promotions and/or the consumer, and is performed by executing a workflow that specifies a sequence of filtering rules and/or algorithms to be applied in selecting the relevant promotions.

Traditionally, relevance systems are implemented using search and/or table lookup methods to match promotions and consumers. These methods use discrete, and, most often, sparsely distributed data, and thus the methods cannot perform fine-grained matches that are based on the interaction terms between the discrete data points. Additionally, a static set of consumer attributes may not be an accurate representation of the dynamics of the consumer's relationship with the promotion and marketing service (e.g., a new consumer may browse information about promotions for some period of time before making a first purchase, and the likelihood of future purchases being made by the consumer will increase after the first purchase is made).

As such, and according to some example embodiments, the systems and methods described herein are therefore configured to rank promotions selected for recommendation to consumers based on predictions of promotion performance and consumer behavior. In some embodiments, for example, a mobile application ("app," hereinafter) consumer is assigned to one of a set of consumer lifecycle model states that each respectively represents a consumer's current level of engagement and/or activation while interacting with the mobile app. Each of the lifecycle model states is associated with a ranking function based on a ranking target that is determined, based on an analysis of historical consumer behavior, to increase the consumer's engagement and/or activation level. A ranking algorithm having a ranking target associated with the consumer's assigned lifecycle model state is selected, and each of a set of promotions that has been selected for recommendation to the consumer through the app is assigned a predicted relevance value by the selected ranking function. The predicted relevance value represents the probability that the consumer's behavior with respect to the promotion will approach the target while the consumer interacts with the app. In some embodiments, the set of promotions selected for recommendation can be sorted and/or ranked based on their respective associated predicted relevance values. The top-ranked promotions may be featured in a presentation to the consumer.

For example, promotions selected for recommendation to a particular consumer via a mobile app may include a golf promotion $75 for two rounds, a service promotion $25 dollars for gutter cleaning and a food and drink promotion $5 for $10 at a sandwich shop. Since the particular consumer has not made a promotion purchase in over 6 months, the consumer is determined to be in a disengaged lifecycle model state in which a promotion purchase as a result of interacting with the mobile app is unlikely. According to embodiments described herein and based on the determined current lifecycle model state of the consumer, the food and drink promotion may become the highest ranked promotion (and thus featured in a presentation on the consumer's device) because a promotion having a low purchase price is more likely to be purchased by consumers.

In some embodiments, a ranking algorithm may be a trainable function that is developed offline using supervised learning. The supervised learning training data sets are derived from collected historical data representing previous promotion performance and previous consumer behavior.

FIG. 1 illustrates an example system 100 that can be configured to implement the relevance ranking of promotions that are available from a promotion and marketing service and are to be recommended to a particular consumer. System 100 comprises a relevance service 110 that returns a set of available promotions 112 that are ranked for relevance to a consumer in response to receiving a request 102 for available promotions on behalf of the consumer; a consumer profiles repository 120 in which data representing profile attributes of consumers are stored; a promotions repository 130 in which data representing attributes of promotions are stored; a consumer activation states repository 140 in which data representing consumer activation states respectively associated with consumers are stored; and a consumer behavioral data repository 150 in which historical data representing the respective consumer behavior of consumers are stored. The relevance service 110 includes a recommendation engine 115 that is configured to select available promotions to be recommended to a particular consumer.

In embodiments, recommendation engine 115 generates a set of available promotions that are most relevant to a consumer in response to receiving consumer identification data representing the consumer as described, for example, in U.S. patent application Ser. No. 13/829,581 entitled "Promotion Offering System" and filed on Mar. 14, 2013, which is incorporated herein in its entirety. In some embodiments, generating the set of available promotions includes selecting the promotions using stored data representing attributes of promotions and/or the consumer, and is performed by executing a workflow that specifies a sequence of filtering rules and/or algorithms to be applied in selecting the relevant promotions. A workflow may include ranking the selected promotions for relevance to the consumer and then ordering the selected promotions based on their respective rankings. In some embodiments, the most highly ranked promotions may be presented to the consumer as featured recommended promotions.

In embodiments, the selection of promotions most relevant to a consumer leverages marketing data representing the consumer's previous consumer behavior. In some embodiments, marketing data includes data that is collected and recorded each time that the consumer interacts with content published by the promotion and marketing service. Examples of collected consumer behavioral data include instances of consumer engagement with the published content (e.g., instances in which a consumer opens a mobile application, clicks on and/or opens an email, or visits a website), and consumer activation state (e.g., instances in which a consumer makes a promotion purchase).

In embodiments, the behavioral data that is collected from a particular consumer is associated with that consumer's identification data so that a collection of multiple instances of behavior from a single consumer may be stored as history data in a consumer behavioral data repository 150. A consumer's identification data may include a unique consumer identifier (e.g., a login identifier that is provided by a consumer when the consumer interacts with the content) and/or at least one consumer-associated bcookie, which is a unique identifier of a device (e.g., a mobile phone, a tablet, or a personal computer) and/or a mobile application or browser from which the consumer accesses the content. For example, in some embodiments, a bcookie for a mobile application that is executing on a mobile device may be a SHA-1 hash of the Unique Device IDentifier, an Apple advertising identifier, or a network MAC address plus a string suffix (e.g., a pre-defined string concatenated with the application version).

In some embodiments, identifying a consumer through associated bcookies ensures that a wider variety of behavioral data may be collected from the consumer since not all types of consumer access to content require the consumer to first provide a unique identifier. For example, a consumer repeatedly may open a mobile application without logging in to browse available promotions, but will log into the application only after deciding to purchase a promotion. Thus, identifying a consumer interaction through a consumer-associated bookie enables collecting consumer engagement behavior data from a consumer who has not yet made a purchase.

Figure 2:
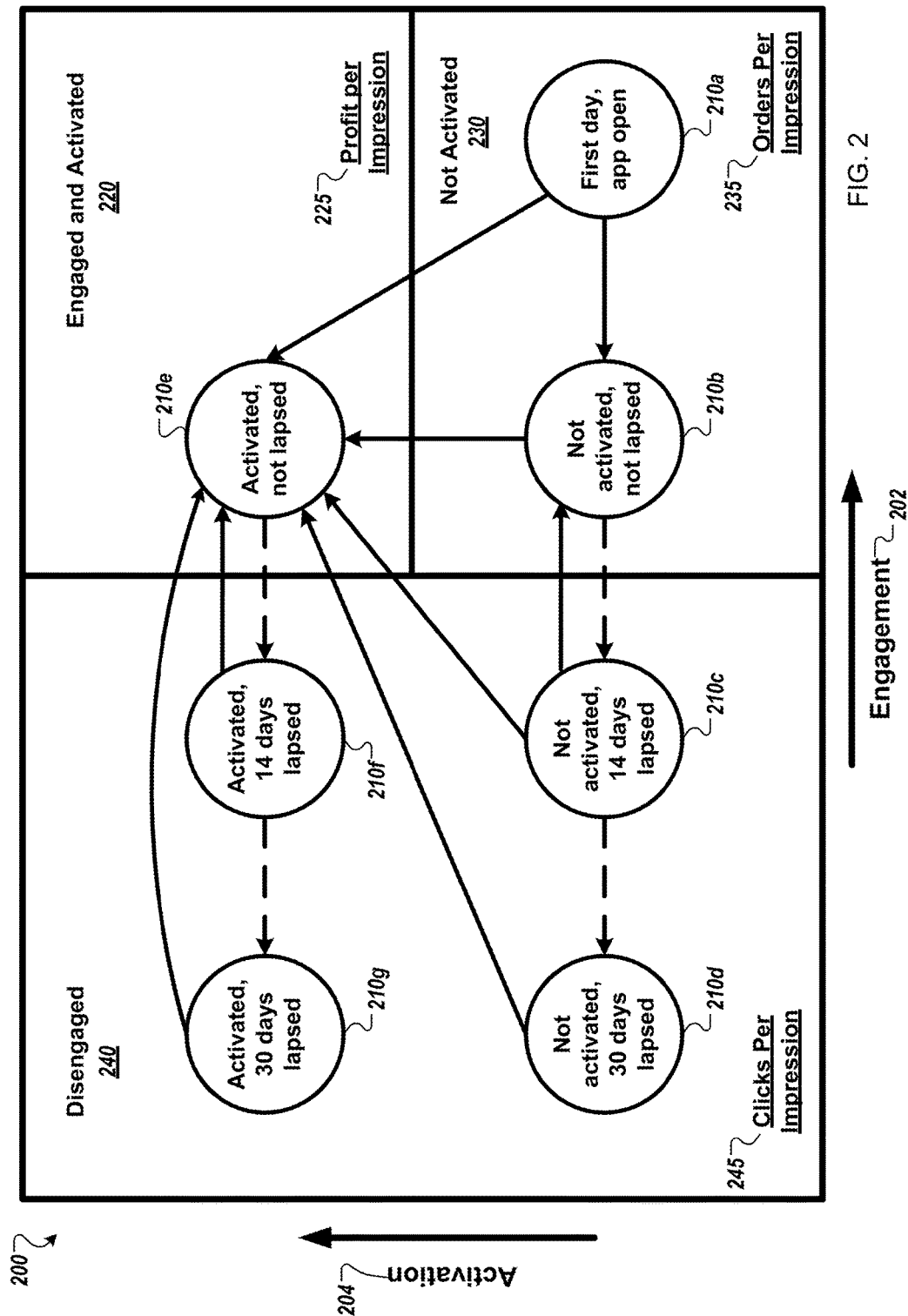
FIG. 2 illustrates an example lifecycle model of consumer interaction behavior with a mobile application that presents promotions available from a promotion and marketing service in accordance with some embodiments discussed herein.

FIG. 2 illustrates an example lifecycle model 200 of consumer interaction behavior with a mobile application ("app") that presents promotions available from a promotion and marketing service. In embodiments, a model representing states of a typical consumer lifecycle may be determined based on historical behavioral data that has been collected from a large sample of consumers.

The lifecycle model 200 includes seven consumer lifecycle model states (210a-g); each state represents relative levels of a consumer's engagement 202 and activation 204 while the consumer interacts with the app. The states along the bottom row (210a-d) have not been activated, i.e., the consumer has not made a promotion purchase while interacting with the app. The states along the top row (210e-g) have been activated, i.e., the consumer has made a promotion purchase while interacting with the app. In some embodiments, the level of engagement represented by a state is determined by the amount of time that has elapsed since the consumer's previous interaction with the app. The lifecycle model 200 includes three relative engagement levels: Current (i.e., no time has elapsed), as represented by states 210a, 210b, and 210e; Moderate (i.e., a first predetermined time window, e.g., 14 days, has elapsed); and Inactive (i.e., a second predetermined time window, e.g., 30 days, has elapsed).

In some embodiments, the consumer lifecycle model states can be grouped into use case categories based on each state's respective levels of engagement 202 and activation 204. The seven consumer lifecycle model states in lifecycle model 200 are grouped into three use case categories: Engaged and Activated 220; Not Activated 230; and Disengaged 240. In some embodiments, the likelihood of a consumer purchasing a promotion while interacting with an app can be predicted based in part on the use case category to which the consumer's lifecycle model state is assigned. For example, in lifecycle model 200, state 210e represents the highest levels of engagement and activation and thus a consumer that is assigned to state 210e is more likely to make a promotion purchase than a consumer assigned to state 210d, which represents the lowest levels of engagement and activation.

As illustrated in FIG. 2, an arrow between two states represents a possible consumer state transition that may occur during the lifecycle of a particular consumer's interactions with the app. Each solid line arrow depicts a state transition in which the relative level of consumer engagement increases or is maintained, while each dotted line arrow depicts a state transition in which the relative level of consumer engagement decreases.

In lifecycle model 200, state 210a represents day 1 of the lifecycle when a consumer initially opens the app. Since there has been no previous interaction with the app, the consumer's lifecycle model state will immediately transition to either of the possible lifecycle model states at the Current (no elapsed time) engagement level: state 210b (not activated, e.g., the consumer browses the app content) or state 210e (activated, e.g., the consumer makes a promotion purchase while interacting with the app).

As illustrated in FIG. 2, the transition to state 210e (activated, not lapsed) in the lifecycle model 200 potentially can occur from any of the other states (210a-d, 210f-g). In embodiments, it has been determined that, based on marketing data, a transition to state 210e includes increasing the relative level of consumer engagement 202. Thus, if an analysis of a particular consumer's behavior determines that a consumer is in a model state other than 210e, increasing the levels of engagement and/or activation of the consumer would be desirable to facilitate a transition from that model state to 210e. In some embodiments, a particular consumer's current lifecycle model state, determined by the consumer's past consumer behavior, can be used to determine a ranking of currently available promotions to be recommended to the consumer. The ranking may be based on a predicted probability that the consumer's interaction with information about the promotions presented in the app will result in an increase in the consumer's engagement and/or activation level and/or result in the consumer's purchase of a promotion. Thus, a lifecycle model based on consumers' past behavior can enable a promotion and marketing service to establish a positive feedback loop to optimize the overall levels of engagement and activation of current consumers.

Figure 3:
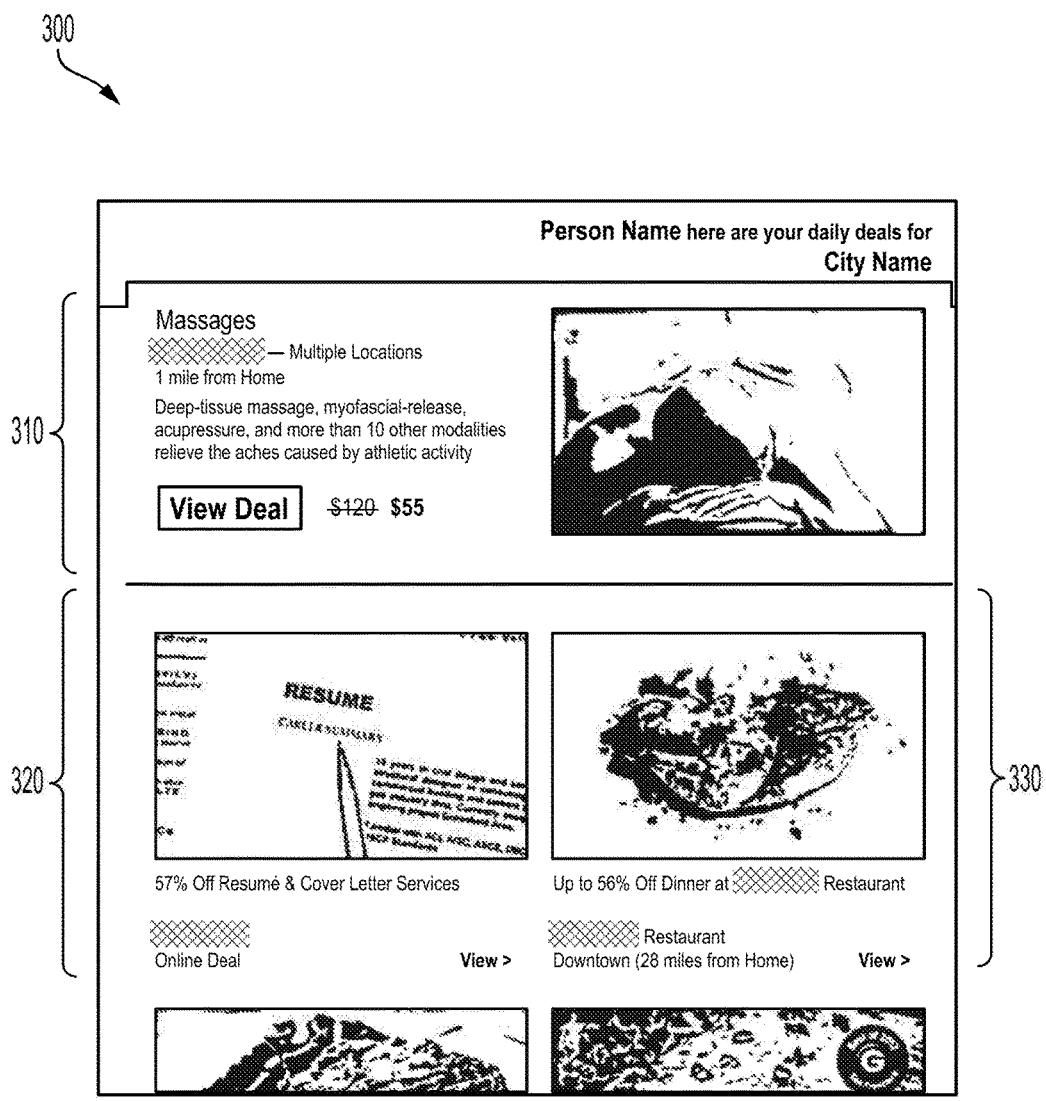
FIG. 3 illustrates a portion of an example email from a promotion and marketing service that contains content describing promotions in accordance with some embodiments discussed herein.

FIG. 3 illustrates a portion of an example email 300 from a promotion and marketing service that contains content describing promotions. The illustrated portion of email 300 includes descriptions of three promotions: a promotion for massages 310; a promotion for resume services 320, and a promotion for a restaurant 330. Summary information about each promotion is displayed within a box graphic. An impression is one view of content summarizing a promotion. Referencing example email 300 content, an impression is a view of the promotion summary information within any one of the box graphics.

With respect to example email 300 content, the summary information describing each promotion includes active content that will enable a consumer to view further details about the promotion. For example, in embodiments, a consumer's selection of a "view deal" link (315, 325, or 335) will cause the opening of a browser window pointed at a website page from the promotion and marketing service that displays more details and/or purchase information about that promotion. Referencing example email 300 content, a click is a consumer's selection of active content (e.g., selection of a "view deal" link).

In some embodiments, consumer interaction behavior with content describing promotions available for purchase may be described as being a three-stage "purchase funnel" in which each successive stage corresponds to higher relative levels of consumer engagement and activation: 1. The consumer opens an app and views the available promotions; 2. The consumer selects one promotion and looks at further details about that promotion; and 3. The consumer purchases the promotion. In the example illustrated in FIG. 2, the Engaged and Activated use case category 220 corresponds to Stage 3 of the purchase funnel.

In some embodiments, the level of consumer engagement may be evaluated in terms of consumer impressions and clicks as the consumer interacts with content. For example, transitions between the previously described purchase funnel stages may be characterized in terms of clicks and impressions: There is one click out of every n impressions (Stage 1→Stage 2), and there is one purchase out of every m clicks (Stage 2→Stage 3), where 10 is an example value of both n and m.

Turning to the exemplary lifecycle model 200 illustrated in FIG. 2, in some embodiments, a promotion and marketing service can characterize a promotion based on its relative profit margin. Purchases of promotions having higher profit margins contribute more to the promotion and marketing service revenue than purchases of promotions having lower profit margins. However, in some embodiments, it has been determined that, based on marketing data, a consumer tends to be less likely to purchase promotions having higher profit margins (e.g., promotions for local services such as restaurants and spas) because they typically also require more of a commitment from the consumer (e.g., after making a promotion purchase, the consumer must travel to the provider site to redeem the promotion instrument). Conversely, it has been determined that a consumer tends to be more likely to purchase promotions having lower profit margins (e.g. promotions for goods) because those promotions typically require less consumer commitment (e.g., after the consumer redeems the promotion instrument, the goods purchased using that instrument are delivered to the consumer's home).

In some embodiments, each of a set of available promotions to be recommended to a particular mobile app consumer can be ranked, based on data representing the promotion's performance and the consumer's behavior, according to a probability that the consumer's behavior in response to the promotion will match a ranking target representing an increase the consumer's lifecycle model state engagement and/or activation level. In some embodiments based on exemplary lifecycle model 200, there may be seven ranking targets, each target respectively being associated with one of the seven lifecycle model states. In some alternative embodiments, there may be three ranking targets, each target respectively being associated with one of the three use case categories.

Consumers in the Engaged and Activated 220 use case category have the highest relative levels of engagement and activation and, as previously described, are most likely to purchase a promotion while interacting with the app. In some embodiments, for example, it has been determined that the majority of the profit made by a promotion and marketing service comes from activated, non-lapsed consumers. Therefore, higher profit margin promotions (representing promotion purchases that generate the most revenue for a promotion and marketing service) should be featured for these consumers. Higher profit margin promotions have been determined, using collected marketing data, to be the promotions that historically have returned the highest amount of profit per impression. Thus, in some embodiments, the recommended promotions for a consumer whose lifecycle model state is within the Engaged and Activated 220 use case category are ranked based on a ranking target of a quantity of profit per impression 225.

Consumers in the Not Activated 230 use case category are engaged, but have not yet activated (i.e., have not yet purchased a promotion). In some embodiments, for example, it has been determined that a significant amount of the profit made by a promotion and marketing service comes from the activation of non-lapsed consumers (i.e., states 210$b$ and 210$e$) and first day opens (i.e., state 210$a$). Thus, lower profit margin promotions (the promotions that are easiest to purchase) should be featured for these consumers to facilitate a transition to another lifecycle model state representing a higher level of engagement and/or activation. Lower profit margin promotions have been determined, using collected marketing data, to be promotions that historically have returned the highest amount of orders per impression. Thus, in some embodiments, the recommended promotions for a consumer whose lifecycle model state is within the Not Activated 230 use case category are ranked based on a ranking target of a quantity of orders per impression 235.

Consumers in the Disengaged 240 use case category have the lowest levels of engagement and are least likely to make a promotion purchase while interacting with the app. Promotions that increase a consumer's level of engagement with the app should be featured for these consumers, to maximize the likelihood that the consumer will open the app again. In some embodiments, additionally and/or alternatively, consumers who have not yet activated and have an Inactive level of engagement (e.g., lifecycle model state 210$d$) may be targeted by the promotion and marketing service for incentives (e.g., CRM promotions) to encourage them to re-engage with the app. Promotions that increase a consumer's level of engagement with the app have been determined, using collected marketing data, to be promotions that historically have returned the highest amount of clicks per impression (e.g., travel promotions), representing an engagement of a consumer's interest while the consumer browses the promotion information. Thus, in some embodiments, the recommended promotions for a consumer whose lifecycle model state is within the Disengaged 240 use case category are ranked based on a ranking target of a quantity of clicks per impression 235.

Figure 4:
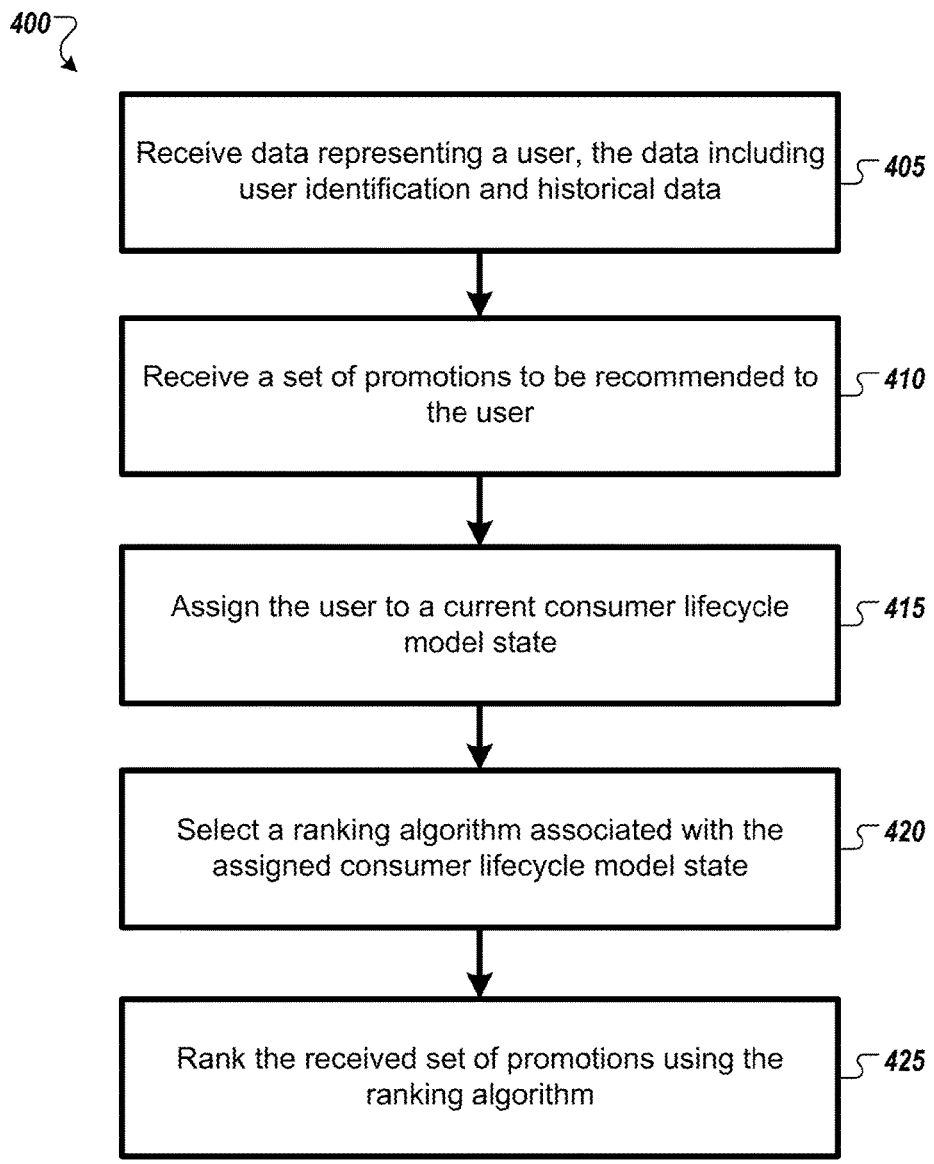
FIG. 4 is a flow diagram of an example process for ranking a set of promotions to be recommended to a user in accordance with some embodiments discussed herein.

FIG. 4 is a flow diagram of an example process 400 for ranking a set of promotions to be recommended to a consumer. For convenience, the process 400 will be described with respect to a system, including one or more computing devices, that performs the process 200. Specifically, the process 400 will be described with respect to its implementation by recommendation engine 115 in system 100.

In embodiments, the system receives 405 data representing a consumer. The data can include consumer identification and, additionally and/or alternatively, historical data representing the consumer's previous consumer behavior. In some embodiments, for example, the consumer identification may include a consumer-associated bcookie that is used by the system to retrieve stored historical data representing the consumer, as previously described with reference to FIG. 1.

In embodiments, the system receives 410 a set of promotions to be recommended to the consumer. For example, in some embodiments, the set of promotions may be selected by executing a sequence of filtering rules and/or algorithms that are applied to stored data representing attributes of promotions and/or the consumer as previously described with reference to FIG. 1.

In embodiments, the system assigns 415 the consumer to a current consumer lifecycle model state based in part on the consumer identification and/or historical data representing the consumer's previous consumer behavior. Turning to the exemplary lifecycle model 200 illustrated in FIG. 2, in some embodiments, the system can use data representing a consumer's previous interactions with a mobile app to determine the consumer's current levels of engagement and/or activation with the app, and, as described previously with reference to FIG. 4, the system can assign the consumer to one of the seven consumer lifecycle model states based on at least one of those determined levels.

In embodiments, the system selects 420 a ranking algorithm having a ranking target associated with the assigned consumer lifecycle model state. As described previously with respect to FIG. 2, in some embodiments, the ranking target is based on consumer behavior and is associated with the levels of engagement and/or activation that characterize the associated consumer lifecycle model state.

In embodiments, the system ranks 425 each of the set of promotions using the ranking algorithm. In some embodiments, the ranking algorithm is a predictive function that calculates a predicted relevance value associated with each promotion using data representing attributes of the promotion and the consumer (e.g., proximity of the consumer's location to the promotion location, the promotion price category, and a value representing the popularity of the promotion among past consumers). In embodiments, the set of promotions can be sorted and/or ranked based on their respective associated predicted relevance values.

In some embodiments, each promotion is represented by a feature vector that includes feature data representing attributes of the promotion and attributes of the consumer. In some embodiments, the feature data elements of the feature vector are selected based on the ranking target. Feature vectors are described in more detail with reference to FIGS. 7A, 7B, and 7C.

In some embodiments, the predictive function maps the feature vector to one of a set of probability classes, each class representing a different probability that the feature vector matches a ranking target. There is a variety of well-known types of predictive functions (e.g., clustering algorithms, classifiers, neural networks, ensemble of trees), and the implementation choice of predictive function is not critical to the invention. In some embodiments, the predictive function may be generated offline using machine learning (i.e., using supervised or unsupervised learning to adapt a function), as described in detail with reference to FIG. 7.

Figure 5:
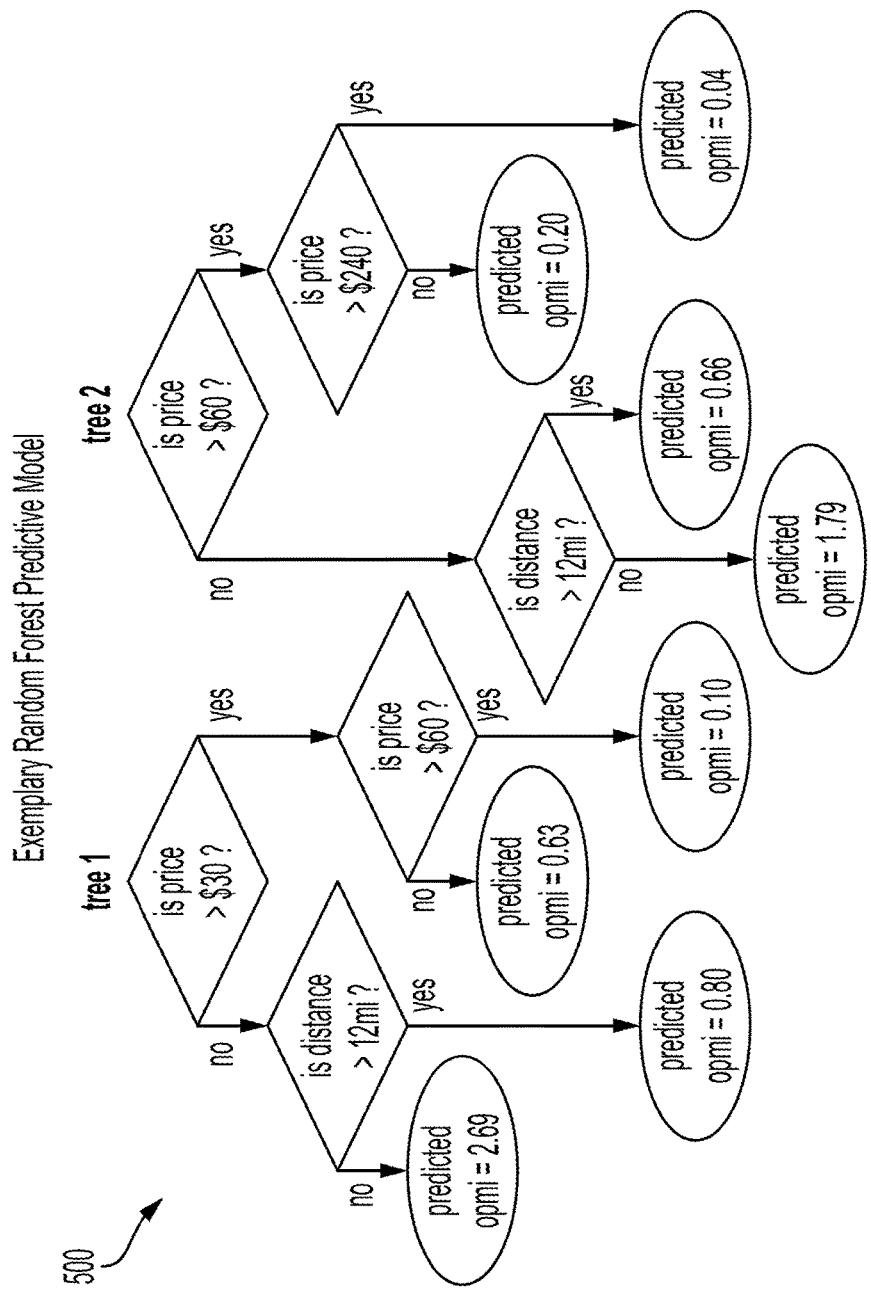
FIG. 5 illustrates an exemplary random forest predictive model for a target of orders per thousand impressions in accordance with some embodiments discussed herein.

FIG. 5 illustrates an exemplary random forest predictive model 500 for a target of orders per thousand impressions (opmi). The model is based on two features: promotion price and promotion distance from the consumer's location.

The exemplary random forest 500 is composed of two trees, and the prediction of the random forest is the average of the predictions from the two trees. The prediction from a tree is determined by beginning at the root node decision (i.e., "is price >$30" for tree 1 and "is price >$60" for tree 2) and then traversing a logic path through the tree to a terminal leaf node based on the decision outcome determined at each successive node along the path. For example, if a promotion costs $20 and is located 8 miles away from the consumer, we would obtain a prediction of 2.69 orders per thousand impressions from traversing a logic path through tree 1, and we would obtain a prediction of 1.79 orders per thousand impressions from traversing a logic path through tree 2. The exemplary random forest 500 prediction is the average of the respective predictions from tree 1 and tree 2, i.e. (2.69+1.79)/2=2.24 orders per thousand impressions, or a 0.224% chance of conversion to an activated and/or more engaged lifecycle model state as a result of showing the impression to the consumer.

FIG. 6A is a table 600A summarizing an exemplary feature set that describes a promotion to be ranked. In embodiments, the features 610 can include attributes of the consumer (e.g., bcookie engagement/activation state (i.e. lifecycle model state), distance from cookie to deal); attributes of the promotion (e.g., deal category, deal price); and consumer behavior of a particular consumer (e.g., # impressions of the deal for the bcookie) and/or historical behavior data collected from a sample of consumers (e.g., clicks per impression of the deal (all bcookies)).

In some embodiments, feature bins 620 can be created to simplify the feature data being extracted. For example, as illustrated in feature set 600, a set of bins is created to represent promotion price in ten dollar increments, and the data representing a promotion price is assigned to the bin with the highest represented price that is less than or equal to the actual promotion price (e.g., a promotion price of $12 would be assigned to bin 10). If feature data has been simplified into a set of bins, the data value assigned to a bin is the average of the values of all the instances assigned to the bin. In some embodiments, the feature data may represent a variety of sizes of collected data 630.

In some embodiments, a feature set is aggregated to produce feature vectors to be used as input for predictive functions. Each of the feature vectors has reduced dimensionality and optimally represents the model of the ranking target associated with the predictive function. For example, in some embodiments in which the type of predictive function is an ensemble of trees, a random forest algorithm is used to produce 10 tree ensembles with a maximum of 20 nodes per tree. The random forest algorithm generates a ranking target model as output, as well as calculates the relative importance of each of the features used in the model. Exemplary feature sets that can be generated using this process are described with reference to FIGS. 6B and 6C.

FIG. 6B is a table 600B summarizing an exemplary feature set used to generate a feature vector for input to a predictive function with an associated ranking target for Non-Activated lifecycle model use cases. This exemplary feature set, along with the relative importance of each feature, was generated using a random forest algorithm. as previously described.

As previously described with reference to FIG. 2, promotions that activate consumers assigned to lifecycle model states that are not lapsed (e.g., states 210a and 210b) should be featured, and these promotions have previously resulted in the highest numbers of orders per impression. As illustrated in table 600B, the number of detailed views of a promotion by the consumer is the top ranked feature used in this model. This suggests that the consumer may look at the details of a promotion in the days prior to purchasing the promotion.

FIG. 6C is a table 600C summarizing an exemplary feature set used to generate a feature vector for input to a predictive function with an associated ranking target for Disengaged lifecycle model use cases. This exemplary feature set, along with the relative importance of each feature, was generated using a random forest algorithm as previously described.

As previously described with reference to FIG. 2, promotions that engage consumers assigned to lifecycle model states that are lapsed (e.g., states 210c, 210d, 210f, and 210g) should be featured, and these promotions have previously resulted in the highest numbers of clicks per impression. As illustrated in table 600C, there is a large amount of click data available and no clear-cut single top-ranked feature, representing the inherent randomness in how consumers browse promotion information. This suggests that certain promotions that encourage browsing in general (e.g., travel promotions) may have the greatest importance for consumers in the Disengaged lifecycle model use cases.

Figure 7:
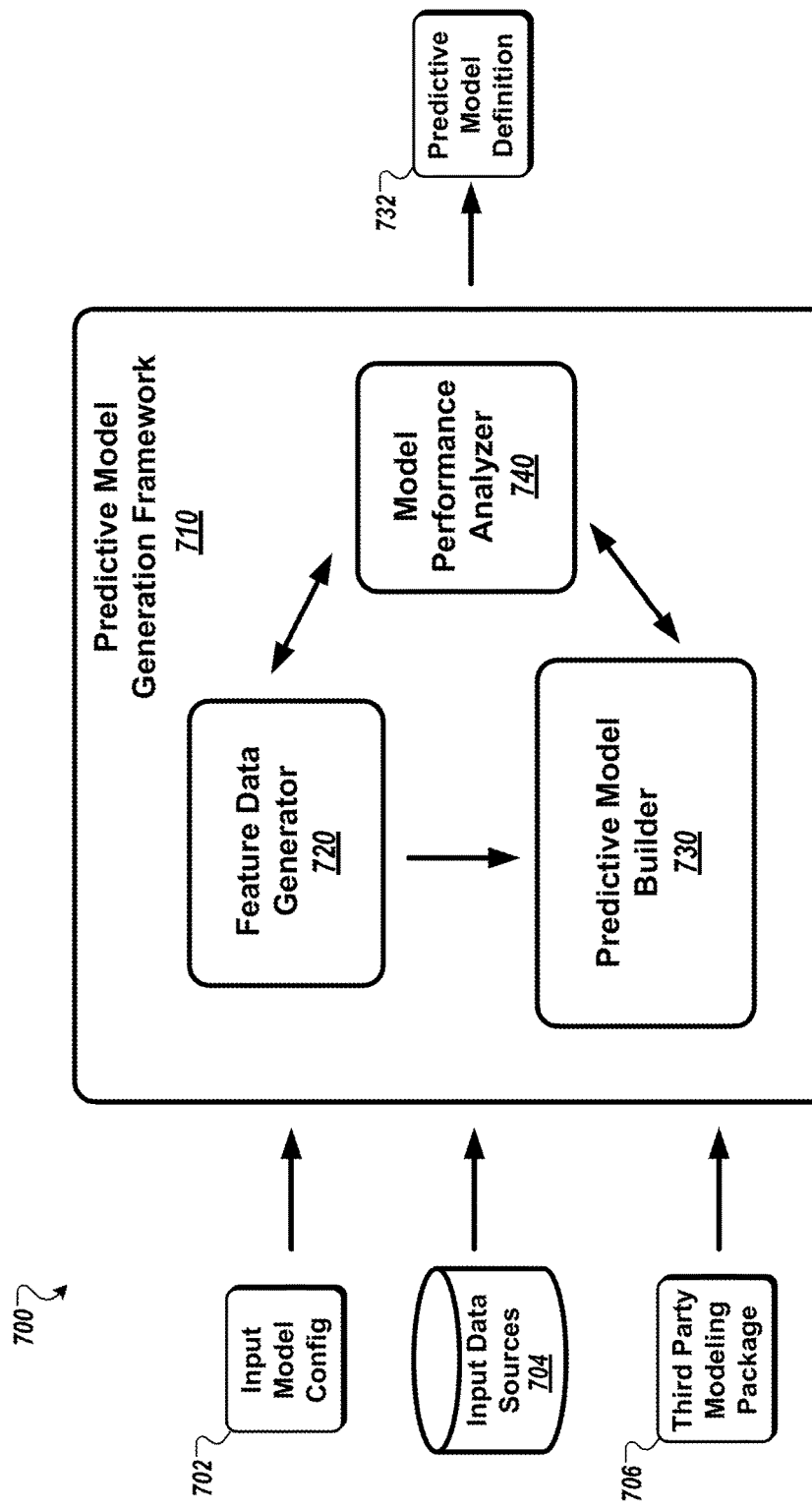
FIG. 7 illustrates an example system 800 that can be configured to implement the offline generation of a ranking algorithm in accordance with some embodiments discussed herein.

FIG. 7 illustrates an example system 700 that can be configured to implement the offline generation of a ranking algorithm. Specifically, system 700 will be described with reference to generation of a ranking algorithm for promotions to be recommended for purchase to a consumer, as implemented by recommendation engine 115 in system 100. System 700 comprises a predictive model generation framework 710 that includes a feature data generator 720; a predictive model builder 730; and a model performance analyzer 740.

As previously described with reference to FIG. 4, in some embodiments, a ranking algorithm is a predictive function that can be generated offline using supervised learning. In a typical supervised learning scenario, a function that maps an input value to one of a set of predefined output values is adapted, in response to exposure to a training data set containing examples of inputs and their respective associated outputs, to perform a mapping that represents a particular predictive model.

In an example scenario based on lifecycle model 200, ranking functions can be generated for a mobile app in North America in July of 2013 based on 3 weeks of historical mobile log data for 1 million random bcookies from North America that was collected during the time period of Mar. 1-21, 2013. This collected data represent a few hundred million impressions, each of which was viewed by a consumer using the mobile app. Associated with each of the impressions are data indicating whether a consumer purchased the promotion. Feature data describing each impression (e.g., distance of the promotion from the location of the consumer, price of the promotion in the impression) are extracted from the collected data. Additionally, the consumer's lifecycle model state at the time of an impression also can be determined based on collected data representing consumer behavior (e.g., whether the consumer had activated yet at the time of the impression (a determination that would require checking all historical purchase data collected for that consumer, not just from the 3 week historical data collection period).

From this input data, two training datasets can be created: one for activated consumers and one for unactivated consumers. The training feature data would be simplified by being aggregated into bins representing ranges of the feature values, e.g., $5-$10, $10-$20, etc. for price and 0 mi-1 mi, 1 mi-2 mi, etc. for distance. Each training dataset consists of a table with one column per feature, and one column for the desired ranking target variable, e.g., a table with distance, price and profit per impression represents the training dataset to generate a predictive function for activated consumers, and a table with distance, price and orders per impression represents the training dataset to generate a predictive function for unactivated consumers.

In some embodiments, predictive model generation framework 710 generates a predictive model definition 732 that can then be deployed onto another system using another application. For example, in some embodiments, a generated predictive model can be represented in Predictive Model Markup Language (PMML), an industry standard language. The PMML representation can be created from an input model configuration 702 using a third party modeling package 706, such as the open-source R application (http://www.r-project.org). The resulting model representation can be deployed to a variety of different systems and platforms, since PMML can be processed by any implementation of an open-source Java PMML API (jpmml, see http://www.jpmml.org). In some embodiments, a predictive model definition 732 is JavaScript Object Notation (JASON) file that can include one or more PMML model definitions, feature definitions, a decision tree for use in selecting a model definition, and/or model definition creation information.

In some embodiments, feature generator 720 creates a training dataset based on historical data that is received from one or more input data sources 704 such as, for example, one or more of consumer profiles repository 120, promotions repository 130, consumer activation states repository 140, and consumer behavioral data repository 150. In some embodiments, the input data sources may also include potential new data sources, which must be incorporated ad hoc. The training dataset feature vector is the same feature vector that is being used to describe production data that are being processed in a workflow by recommendation engine 115. In some embodiments, the determination of the feature vector elements is based in part on the predictive model ranking target, as described previously with reference to FIGS. 6A, 6B, and 6C. Additionally and/or alternatively, the determination of the feature vector elements is based in part on relevance scoring that is implemented within a workflow that is executed by the relevance engine 115. In some embodiments, the input model configuration 702 includes methods for extracting the predictive model feature values from input data sources 704. In some embodiments, model performance analyzer 740 may be used to optimize training data set creation and/or predictive model building.

Figure 8:
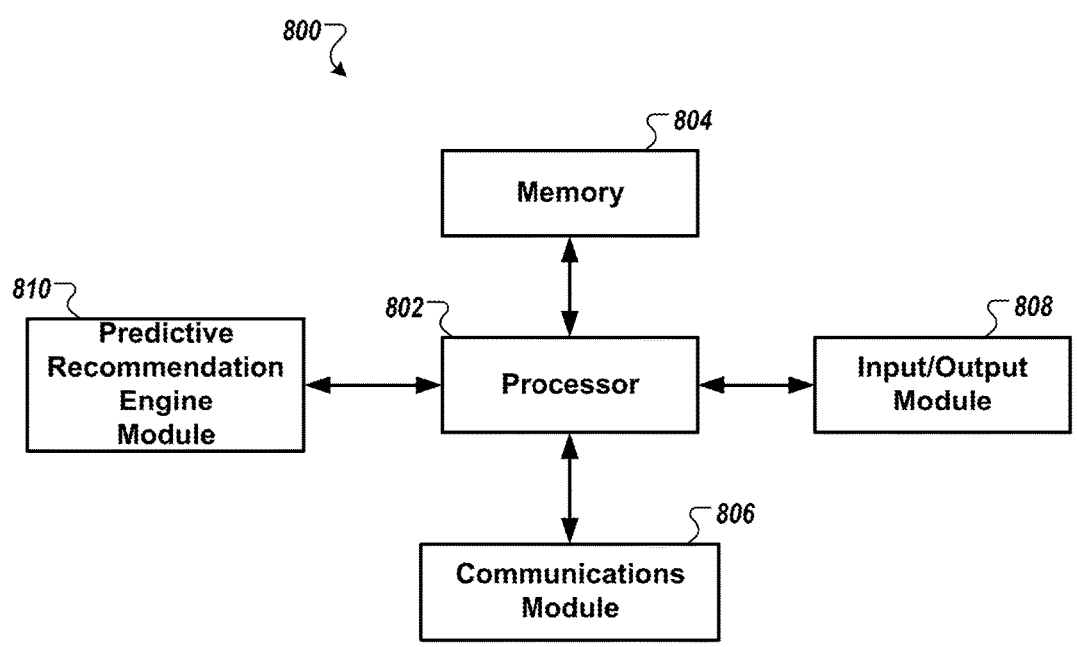
FIG. 8 illustrates a schematic block diagram of circuitry that can be included in a computing device, such as a recommendation engine, in accordance with some embodiments discussed herein.

FIG. 8 shows a schematic block diagram of circuitry 800, some or all of which may be included in, for example, recommendation engine 115. As illustrated in FIG. 8, in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIGS. 1, 4, and 7.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIG. 1. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800, such as for example, pharmacy terminal 108. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Predictive recommendation engine module 810 may also or instead be included and configured to perform the functionality discussed herein related to the recommendation engine discussed above. In some embodiments, some or all of the functionality of predictive recommendation engine may be performed by processor 802. In this regard, the example processes and algorithms discussed herein can be performed by at least one processor 802 and/or predictive recommendation engine module 810. For example, non-transitory computer readable media can be configured to store firmware, one or more application programs, and/or other software, which include instructions and other computer-readable program code portions that can be executed to control each processor (e.g., processor 802 and/or predictive recommendation engine module 810) of the components of system 400 to implement various operations, including the examples shown above. As such, a series of computer-readable program code portions are embodied in one or more computer program products and can be used, with a computing device, server, and/or other programmable apparatus, to produce machine-implemented processes.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or predictive recommendation engine module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for relevance ranking of promotions that are available from a promotion and marketing service and are to be recommended to a particular consumer, the method comprising:

receiving, using a processor, data describing the particular consumer, the data including user identification data including a bcookie and historical data including previous behavioral data signals collected and recorded each time that the consumer interacted with content published by the promotion and marketing service and displayed on at least one client device associated with the particular consumer, wherein the historical data is retrieved using the bcookie;

receiving, using the processor, a set of promotions recommended for the particular consumer, wherein the set of promotions recommended for the particular consumer is selected by executing a workflow sequence of filtering rules and algorithms that are applied to stored data representing attributes of promotions and the particular consumer, wherein executing the workflow sequence includes ordering the set of promotions according to a ranking of relevance to the consumer;

assigning, using the processor and based in part on the historical data and the user identification data, a consumer lifecycle model state of a plurality of consumer lifecycle model states to the particular consumer, wherein each consumer lifecycle model state represents a different combination of relative levels of consumer engagement and activation behavior, the consumer lifecycle model state is assigned by the processor performing:

determining a level of consumer engagement representing a measure of time that has elapsed since the particular consumer's most recent interaction with content published by the promotion and marketing service, wherein the level of consumer engagement is one of: a current engagement when no time has elapsed since the particular consumer's most recent interaction with the content, a moderate engagement when a first predetermined window has elapsed since the particular consumer's most recent interaction with the content, or an inactive engagement when a second predetermined window has elapsed since the particular consumer's most recent interaction with the content; and determining a level of activation behavior representing whether or not the particular consumer has made a promotion purchase while interacting with the content published by the promotion and marketing service, wherein the level of activation behavior is one of: an activated behavior when the particular consumer has made a promotion purchase while interacting with the content published by the promotion and marketing service or a not activated behavior when the particular consumer has not made a promotion purchase while interacting with the content published by the promotion and marketing service;

selecting, using the processor, a ranking algorithm associated with the consumer lifecycle model state assigned to the particular consumer, wherein the ranking provided by the ranking algorithm is based on a predicted probability that the ranking will result in a different lifecycle model state being assigned to the particular consumer; and transmitting for display, using the processor and to the client device, a subset of promotions from the set of promotions, the subset of promotions comprising a top N number of promotions based on the ranking algorithm in an instance in which the particular customer accesses the promotion and marketing service via the client device associated with the particular customer.

2. The method of claim 1, wherein the ranking algorithm is based on a ranking target, wherein the ranking target is a desired different consumer lifecycle model state to be assigned to the particular consumer based on an interaction by the particular consumer with the content published by the promotion and marketing service.

3. The method of claim 2, wherein the ranking target is based on one or more of a quantity of orders per impression, a quantity of profit per impression, or a quantity of clicks per impression.

4. The method of claim 1, wherein calculating, using the processor, the predicted promotion relevance value associated with a promotion using the ranking algorithm comprises:
generating a feature vector describing the promotion using feature data representing attributes of the particular consumer and attributes of the promotion; and
calculating the predicted promotion relevance value using the feature vector.

5. The method of claim 4, wherein the feature data representing attributes of the particular consumer includes at least one of the historical data representing the particular consumer and the user identification.

6. The method of claim 4, wherein the ranking algorithm is generated using supervised learning.

7. The method of claim 6, wherein the ranking algorithm is a classifier, a neural network, or an ensemble of decision trees.

8. The method of claim 1, wherein the consumer lifecycle model state is selected from one of not engaged and activated, activated, or disengaged.

9. The method of claim 1, wherein the received set of promotions recommended for the particular consumer is ranked as part of a workflow for selecting the promotions recommended for the particular consumer.

10. The method of claim 1, wherein the bcookie includes at least one of a group of user identifiers including an SHA-1 hash of a Unique Device Identifier (UUID) calculated for a device associated with the particular consumer, and a network MAC address plus a string suffix.

11. The method of claim 1,
wherein each promotion of the set of promotions is characterized based on its relative profit margin, the relative profit margin being in comparison to the other promotions of the set of promotions, and
wherein the predicted probability that the ranking will result in a different lifecycle model state being assigned to the particular consumer is based in part on the relative profit margins of each promotion of the set of promotions.

12. A system for relevance ranking of promotions that are available from a promotion and marketing service and are to be recommended to a particular consumer by performing operations, comprising:
one or more computers and one or more storage devices storing instructions that are operable, when executed by the one or more computers, to cause the one or more computers to:
receive data describing the particular consumer, the data including user identification data including a bcookie and historical data including previous behavioral data signals collected and recorded each time that the consumer interacted with content published by the promotion and marketing service and displayed on at least one client device associated with the particular consumer, wherein the historical data is retrieved using the bcookie;
receive a set of promotions recommended for the particular consumer, wherein the set of promotions recommended for the particular consumer is selected by executing a workflow sequence of filtering rules and algorithms that are applied to stored data representing attributes of promotions and the particular consumer, wherein executing the workflow sequence includes ordering the set of promotions according to a ranking of relevance to the consumer;
assign, based in part on the historical data and the user identification data, a consumer lifecycle model state of a plurality of consumer lifecycle model states to the particular consumer, wherein each consumer lifecycle model state represents a different combination of relative levels of consumer engagement and activation behavior, the consumer lifecycle model state is assigned by:
determining a level of consumer engagement representing a measure of time that has elapsed since the particular consumer's most recent interaction with content published by the promotion and marketing service, wherein the level of consumer engagement is one of: a current engagement when no time has elapsed since the particular consumer's most recent interaction with the content, a moderate engagement when a first predetermined window has elapsed since the particular consumer's most recent interaction with the content, or an inactive engagement when a second predetermined window has elapsed since the particular consumer's most recent interaction with the content; and
determining a level of activation behavior representing whether or not the particular consumer has made a promotion purchase while interacting with the content published by the promotion and marketing service, wherein the level of activation behavior is one of: an activated behavior when the particular consumer has made a promotion purchase while interacting with the content published by the promotion and marketing service or a not activated behavior when the particular consumer has not made a promotion purchase while interacting with the content published by the promotion and marketing service;
select a ranking algorithm associated with the consumer lifecycle model state assigned to the particular consumer, wherein the ranking provided by the ranking algorithm is based on a predicted probability that the ranking will result in a different lifecycle model state being assigned to the particular consumer; and
transmit for display, to the client device, a subset of promotions from the set of promotions, the subset of promotions comprising a top N number of promotions based on the ranking algorithm in an instance in which the particular customer accesses the promotion and marketing service via the client device associated with the particular customer.

13. The system of claim 12, wherein the ranking algorithm is based on a ranking target, wherein the ranking target is a desired different consumer lifecycle model state to be assigned to the particular consumer based on an interaction by the particular consumer with the content published by the promotion and marketing service.

14. The system of claim 13, wherein the ranking target is based on one or more of a quantity of orders per impression, a quantity of profit per impression, or a quantity of clicks per impression.

15. The system of claim 12, wherein calculating the predicted promotion relevance value associated with a promotion using the ranking algorithm comprises:
generating a feature vector describing the promotion using feature data representing attributes of the particular consumer and attributes of the promotion; and calculating the predicted promotion relevance value using the feature vector.

16. The system of claim 15, wherein the feature data representing attributes of the particular consumer includes at least one of the historical data representing the particular consumer and the user identification.

17. The system of claim 15, wherein the ranking algorithm is generated using supervised learning.

18. The system of claim 17, wherein the ranking algorithm is a classifier, a neural network, or an ensemble of decision trees.

19. The system of claim 12, wherein the consumer lifecycle model state is selected from one of not engaged and activated, activated, or disengaged.

20. The system of claim 12, wherein the received set of promotions recommended for the particular consumer is ranked as part of a workflow for selecting the promotions recommended for the particular consumer.

21. The system of claim 12, wherein the bcookie includes at least one of a group of user identifiers including an SHA-1 hash of a Unique Device Identifier (UUID) calculated for a device associated with the particular consumer, and a network MAC address plus a string suffix.

22. A computer program product for relevance ranking of promotions that are available from a promotion and marketing service and are to be recommended to a particular consumer, encoded on a computer-readable medium, operable to cause a data processing apparatus to:
receive data describing the particular consumer, the data including user identification data including a bcookie and historical data including previous behavioral data signals collected and recorded each time that the consumer interacted with content published by the promotion and marketing service and displayed on at least one client device associated with the particular consumer, wherein the historical data is retrieved using the bcookie;
receive a set of promotions recommended for the particular consumer, wherein the set of promotions recommended for the particular consumer is selected by executing a workflow sequence of filtering rules and algorithms that are applied to stored data representing attributes of promotions and the particular consumer, wherein executing the workflow sequence includes ordering the set of promotions according to a ranking of relevance to the consumer;
assign, based in part on the historical data and the user identification data, a consumer lifecycle model state of a plurality of consumer lifecycle model states to the particular consumer, wherein each consumer lifecycle model state represents a different combination of relative levels of consumer engagement and activation behavior, the consumer lifecycle model state is assigned by:
determining a level of consumer engagement representing a measure of time that has elapsed since the particular consumer's most recent interaction with content published by the promotion and marketing service, wherein the level of consumer engagement is one of: a current engagement when no time has elapsed since the particular consumer's most recent interaction with the content, a moderate engagement when a first predetermined window has elapsed since the particular consumer's most recent interaction with the content, or an inactive engagement when a second predetermined window has elapsed since the particular consumer's most recent interaction with the content; and
determining a level of activation behavior representing whether or not the particular consumer has made a promotion purchase while interacting with the content published by the promotion and marketing service, wherein the level of activation behavior is one of: an activated behavior when the particular consumer has made a promotion purchase while interacting with the content published by the promotion and marketing service or a not activated behavior when the particular consumer has not made a promotion purchase while interacting with the content published by the promotion and marketing service;
select a ranking algorithm associated with the consumer lifecycle model state assigned to the particular consumer, wherein the ranking provided by the ranking algorithm is based on a predicted probability that the ranking will result in a different lifecycle model state being assigned to the particular consumer;
transmit for display, to the client device, a subset of promotions from the set of promotions, the subset of promotions comprising a top N number of promotions based on the ranking algorithm in an instance in which the particular customer accesses the promotion and marketing service via the client device associated with the particular customer.

23. The computer program product of claim 22, wherein the ranking algorithm is based on a ranking target, wherein the ranking target is a desired different consumer lifecycle model state to be assigned to the particular consumer based on an interaction by the particular consumer with the content published by the promotion and marketing service.

24. The computer program product of claim 23, wherein the ranking target is based on one or more of a quantity of orders per impression, a quantity of profit per impression, or a quantity of clicks per impression.

25. The computer program product of claim 22, wherein calculating the predicted promotion relevance value associated with a promotion using the ranking algorithm comprises:
generating a feature vector describing the promotion using feature data representing attributes of the particular consumer and attributes of the promotion; and
calculating the predicted promotion relevance value using the feature vector.

26. The computer program product of claim 25, wherein the feature data representing attributes of the particular consumer includes at least one of the historical data representing the particular consumer and the user identification.

27. The computer program product of claim 25, wherein the ranking algorithm is generated using supervised learning.

28. The computer program product of claim 27, wherein the ranking algorithm is a classifier, a neural network, or an ensemble of decision trees.

29. The computer program product of claim 22, wherein the consumer lifecycle model state is selected from one of not engaged and activated, activated, or disengaged.

30. The computer program product of claim 22, wherein the received set of promotions recommended for the particular consumer is ranked as part of a workflow for selecting the promotions recommended for the particular consumer.

31. The computer program product of claim 22, wherein the bcookie includes at least one of a group of user identifiers including an SHA-1 hash of a Unique Device Identifier (UUID) calculated for a device associated with the particular consumer, and a network MAC address plus a string suffix.

* * * * *